FOLDABLE RECORDING

Filed May 20, 1966

INVENTOR:
Harry Gorman
BY Homer J. Bridger

United States Patent Office 3,469,849

Patented Sept. 30, 1969

3,469,849

FOLDABLE RECORDING

Harry Gorman, Bronx, N.Y.
(200 W. 54th St., New York, N.Y. 10019)

Filed May 20, 1966, Ser. No. 551,684
Int. Cl. G11b 25/04
U.S. Cl. 274—42 9 Claims

ABSTRACT OF THE DISCLOSURE

A phonograph record in which a spiral record track is impressed into a layer of flexible material laminated to a substrate which is scored along its side remote from the flexible layer. It is scored to a depth less than its thickness and along a line lying within the outline of the recording track. The record is folded inwardly (to enclose the track) along the flexible layer at the score line and, because of inherent elasticity of this flexible layer, the phonograph record can be flattened without significant distortion of the record. Other features of the invention appear in the following specification and in the accompanying drawing.

My present invention relates to a foldable recording and method of making same.

In my copending application Ser. No. 258,020 filed Feb. 12, 1963, I have disclosed a so-called "paper" record of the sound-reproducing type wherein a sound-reproducing groove is impressed in a layer of a thermoplastic or other deformation-retaining film adhesively or thermally bonded to a paper or other relatively thin substrate. As was noted in that application, such records are prone to distortion in their normal handling and distribution and, prior to the improvement set forth therein, also had insufficient rigidity to render them usable for quality reproduction. While the arrangement disclosed therein has been found to be highly satisfactory for the purposes indicated, it must be noted that sound-reproducing recordings of the "paper" type are relatively inexpensive and have found their major use in promotional (i.e. advertising) and informational distributions. For such purposes, it has been necessary heretofore to provide mailers or envelopes for the recordings whose lengths and widths would at least be equal to the diameter of the recorded portion of the sound-reproducing face. These sizes differ from those normally used in business and commercial channels in that they are too wide in at least one dimension for the conventional mailing envelope. Since most mailboxes and Post Office handling facilities are designed for conventional envelopes, damage to the record or mailer often resulted when the envelope was inserted into a mailbox of insufficient size. Such odd sizes caused special handling problems in the Post Office and made this record more difficult to handle, store and often required the manufacture of special oddsize envelopes for distribution of such records. To avoid such disadvantages, advertising personnel and other distributors of such recordings have avoided their use unless they were inserted in an envelope provided with a backing member, incorporated in a box or other package, or were distributed by hand. It is evident that the foregoing disadvantages have constituted a strong impediment to the widespread use of such recordings.

It is, therefore, an important object of the present invention to provide an improved sound-recording medium which is capable of assuming comparatively small dimensions and which is not as susceptible to handling damage and distortion as earlier records of the so-called "paper" type.

Another object of this invention is to provide a method of making a recording medium of the general character described which permits the medium to be handled conveniently in conventional channels without any significant distortion of the informational material recorded thereon.

These objects and others which will become apparent hereinafter are attained, in accordance with the present invention, in a recording generally of the "paper" type which, surprisingly, is folded across the recording face, it having been discovered that—under certain circumstances—such folding does not materially distort the recording track on the face of the record. Essentially the present invention resides in my discovery that, when a flexible film layer (generally of a thermoplastic or other plastically deformable synthetic resin) is adhesively bonded to a surface of a substrate (generally a cellulosic layer such as paper), it is possible to impress upon the laminated body thus produced a sound-recording track (e.g. a phonograph-record groove) and also to score the reverse side of the laminated body along a straight line across the outline of the record track to a depth not exceeding the thickness of the substrate (i.e. without penetration of the film) layer and, preferably, only to the adhesive layer. The recording can then be folded with the film-face and recording track inwardly along this line without damage either to the track or to the information recorded thereon; thus, when the folded recording is opened, it tends to lie substantially flat and can be played back by a phonograph stylus without catching, jumping or significant distortion.

It will thus be understood that the record, in addition to being folded along the periphery of the recording face as described in the aforementioned copending application, can have one or more folds across the recording face, e.g. along sector lines or chords of a circular recording face and its spiral recording track. Advantageously, the "scoring" can completely sever the substrate to the plastically deformable and flexible film and for adhesive although it may be and frequently is desirable to score the substrate only partially and permit a complete separation at the substrate only upon folding of the recording. In some cases, however, a scoring of the substrate to a depth less than the total thickness thereof will leave a substrate web connecting the portions of the record face of sufficient flexibility, when considered with the film, to permit bending without such substrate separation. Furthermore, the bending or fold line can extend along a diameter of the recording face.

While it has been found that substantially any form of recording upon the film may be used without distortion, the most surprising effect is obtained with mechanical recordings of the type employing an impression in the film layer. Recordings of the latter type include phonograph-record grooves. When the laminated and folded record is to be employed for phonograph-type recording, it is advantageous to form the layers with the spindle hole, or provide a weakened central zone or other means to accommodate the spindle of the record player. The folding line can, without difficulty, pass through this weakened zone or intersect the aperture formed at the central region, but may also be offset therefrom. The assembly can thus be folded to a fraction of the length and/or width of the recording face and thus be easily accommodated in relatively small mailing envelopes of commercial proportions.

The record can also be provided with scored folds, tabs or other stiffening means that will insure that the record, in use on a record player, will lie flat.

The above and other objects, features and advantages of the present invention will become more readily apparent from the following description, reference being made to the accompanying drawing in which.

Figure 1:
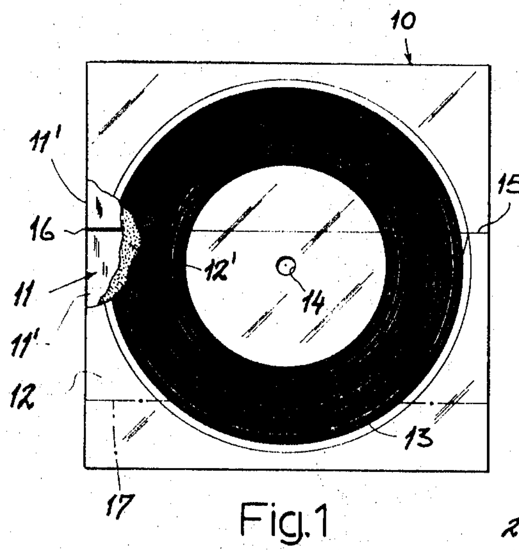
FIG. 1 is a plan view of an open record, in accordance with the present invention, partly broken away.

Referring first to the record 10 illustrated in FIG. 1, it can be seen that the usual paper, cardboard or other relatively stiff substrate 11 is provided with a film layer 12 of a flexible synthetic resin adapted to be plastically deformed (e.g. under heat and pressure) to receive the phonograph-record groove 13 constituting the information-carrying, i.e. sound-recording track. The film 12 is held onto the substrate by an adhesive layer 12' and is constituted as described in my copending application mentioned above, and is provided with the track 13 by conventional pressing methods. Before, during or after the pressing operation, a central spindle-receiving aperture 14 can be formed in the laminated sheet at a central location with respect to the recording track 13. In accordance with the present invention, the substrate 11 is partially scored or cut through along a fold line 15, the scoring being indicated generally at 16, and extending to a depth, from the rear face of the record, equal substantially to the thickness of the substrate. The scoring 16 thus must penetrate no deeper than the adhesive layer 12' and separates the substrate 11 into two sections 11' and 11'', the latter of which may be folded over along the line 15 which extends through the record track 13 as a chord or secant so that the upper edge of the record will lie along the dot-dash line 17 and the overall width of the record will be a fraction of its length.

Figures 3, 4, 5, 6, 7:
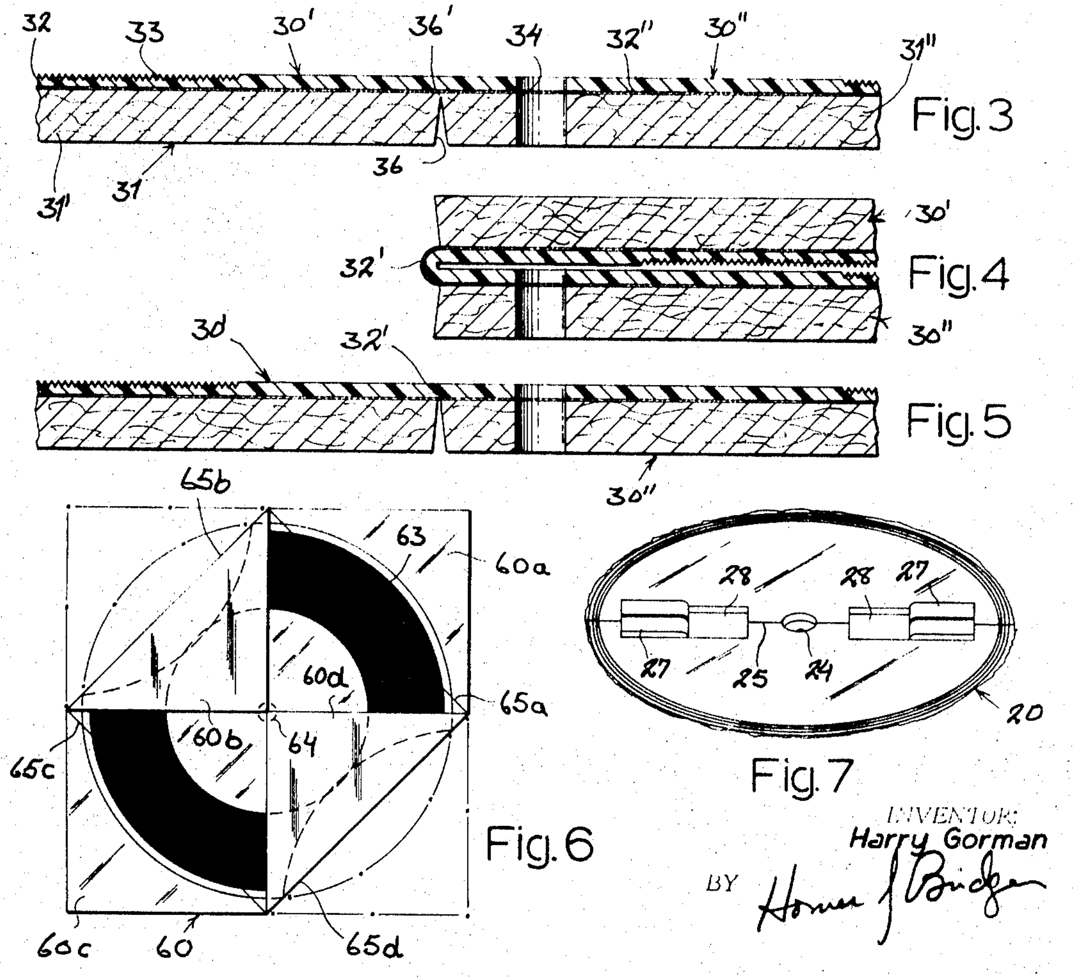
FIG. 3 is a fragmentary cross-sectional view through a recording medium of the present invention prior to folding.
FIG. 4 is a view of the corresponding portion of the recording medium after folding.
FIG. 5 is another sectional view showing the record of FIGS. 3 and 4 in its unfolded state preparatory to playing.
FIG. 6 is an elevational view of a partly folded record, in accordance with another feature of this invention.
FIG. 7 is a fragmentary perspective view of another recording.

As can be seen in FIG. 3, the sound-recording track 33 is a groove impressed into the film layer 32, which is bonded to the substrate 31 by the adhesive layer 32'', while the spindle aperture 34 passes through both these layers. The scoring 36 can here extend to a depth less than the thickness of the substrate 31 so that a folding of the record portion 30' inwardly over the record portion 30'' will cause a rupture of the web 36' initially connecting the substrate portions 31' and 31''. Thus, the fold is effected along a strip 32' of the flexible film. The latter can be a cellulose ester such as cellulose triacetate or polyethylene terephthalate resin of Mylar or Kodel, or any other thermoplastic material capable of receiving and retaining on information-containing track. When the record is unfolded (FIG. 5), the strip 32' of the film 32 connects the two portions 30' and 30'' of the recording and it has been found that the record can then be played as if there had been no distortion of the recording track even though the strip 32' extends across the face thereof.

The adhesive is a solvent deposited copolymer consisting of equal parts of vinyl chloride and vinyl acetate monomer. The laminate can thus be a cast or extruded cellulose acetate or triacetate, irradiated or non-irradiated polyethylene or polypropylene, polyurethane or one of the polyesters mentioned above.

Figure 2:
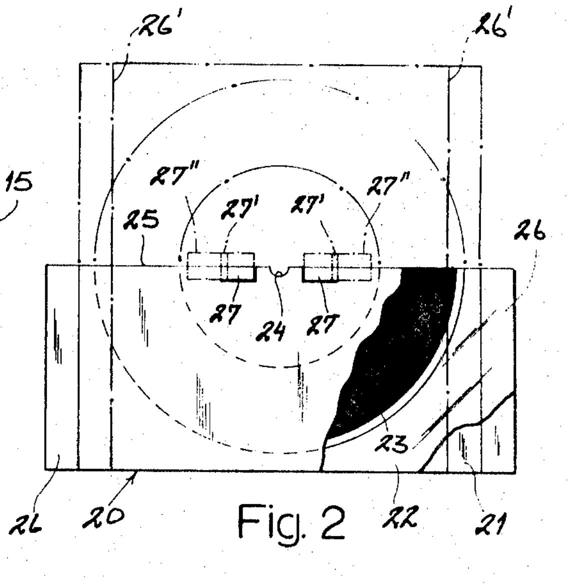
FIG. 2 is a similar view of another record in its folded state.

In FIG. 2, I show a modified record 20 in which the fold line 25 extends diametrally through the recording track 23 and thus intersects the spindle aperture 24. Here again, the track 23 is impressed into a film 22 on a substrate 21. In the folded state of the record (solid lines in FIG. 2), the entire record is concealed and protected by the folded-over portions. Here again, the record can be unfolded (dot-dash line) to its full playing size. The flaps

26 along the edges can be turned under the record face as shown at 26' to constitute reinforcing ribs or stiffeners transverse to the fold 25. Tabs 27 adjacent the spindle aperture can be lifted up (27') or folded under (27'') to serve as the sole or exclusive stiffeners. They can also be used jonitly with the flaps 26. In FIG. 7, I show the tabs 27 in greater detail, the tabs being bent out of their openings 28 to span the fold 25 and stiffen the latter.

In the arrangement of FIG. 6, the record 60 has its substrate scored along a plurality of chordal fold lines **65*a*, 65*b*, 65*c* and 65*d* to define inwardly foldable triangular portions 60*a*, 60*b*, 60*c* and 60*d* whose unfolded positions are indicated by dot-dash line. In this arrangement, the four folding portions can be turned inwardly to overlie and enclose the entire recording track 63. The spindle perforation is formed by removing a weakened portion 64** prior to use of the device.

The invention described and illustrated is believed to admit of many modifications within the ability of persons skilled in the art, all such modifications being considered within the spirit and scope of the invention.

I claim:

1. A method of making a recording medium, comprising the step of laminating a layer of a flexible material onto a substrate layer to form a laminated sheet; impressing into said layer of flexible material a spiral phonograph-record groove to form a generally circular recording face on said sheet; forming said sheet with a spindle-receiving portion centrally of said recording face; scoring said substrate layer along at least one straight line from a side opposite said layer of flexible material without penetrating the latter and cross the outline of said recording face; and angularly folding said sheet along said straight line at said layer of flexible material to at least partially enclose said recording face, said material having sufficient flexibility to allow itself to be folded upon itself and re-opened without materially distorting same and the record groove thereon.

2. The method defined in claim 1 wherein said layer of flexible material is bonded to said substrate layer by an intervening layer of an adhesive.

3. The method defined in claim 1 wherein said substrate layer is scored to a depth less than its thickness to produce a web rupturable upon said folding of said sheet.

4. The method defined in claim 1 wherein said substrate layer is cut through along said line prior to folding said sheet.

5. A folded record comprising a laminated sheet having a layer of a flexible material bonded to a substrate; and a spiral phonograph-record groove impressed into said layer of flexible material to form a generally circular record face on said sheet, said substrate being scored at least along one straight line in said substrate at a side thereof opposite said layer of flexible material without penetration thereof to subdivide said sheet into at least a pair of portions, said portions being angularly folded along said line at said layer of flexible material to at least partly enclose said record face, said material having sufficient flexibility to allow itself to be folded upon itself and re-opened without materially distorting same and the record groove thereon.

6. A record as defined in claim 5, further comprising a layer of an adhesive bonding said layer of flexible material to said substrate, said straight line extending along at least one chord of the spiral track, said record further comprising a spindle-receiving portion disposed centrally of said track.

7. A record as defined in claim 6 wherein said straight line intersects said spindle-receiving portion and said portions substantially wholly conceal said track in a folded condition of said sheet.

8. A record comprising a laminated sheet having a layer of a flexible material bonded to a substrate;

a recording in the form of a spiral phonograph-record track impressed into said layer of flexible material to form a record face on said sheet, said substrate being scored at least along one line in said substrate corresponding to a chord of the spiral in a side of the substrate opposite said layer of flexible material without penetration thereof to subdivide said sheet into at least a pair of portions foldable at said layer of flexible material to at least partly enclose said record face;

a spindle-receiving portion disposed centrally on said track; and stiffening means at said spindle-receiving portion for maintaining said sheet open and generally flat at said line.

9. A record comprising a laminated sheet having a layer of a flexible material bonded to a substrate;

a recording in the form of a spiral phonograph-record track impressed into said layer of flexible material to form a record face on said sheet, said substrate being scored at least along one line in said substrate corresponding to a chord of the spiral in a side of the substrate opposite said layer of flexible material without penetration thereof to subdivide said sheet into at least a pair of portions foldable at said layer of flexible material to at least partly enclose said record face;

a spindle-receiving portion disposed centrally on said track; and stiffening means outwardly of said track and extending transversely to said line for maintaining said sheet open and generally flat at said line.

References Cited

UNITED STATES PATENTS

| | | | |
|---|---|---|---|
| 1,146,387 | 7/1915 | Aylsworth | 274—42 |
| 1,541,002 | 6/1925 | Shramek | 274—42 |
| 2,188,730 | 1/1940 | Swab | 229—68 |
| 3,143,276 | 8/1964 | Nichols | 229—55 |
| 3,301,467 | 1/1967 | Shore | 229—68 |

HARRY N. HAROIAN, Primary Examiner